United States Patent
Wu et al.

(10) Patent No.: US 9,928,438 B2
(45) Date of Patent: Mar. 27, 2018

(54) HIGH ACCURACY LOCALIZATION SYSTEM AND METHOD FOR RETAIL STORE PROFILING VIA PRODUCT IMAGE RECOGNITION AND ITS CORRESPONDING DIMENSION DATABASE

(71) Applicant: Conduent Business Services, LLC, Dallas, TX (US)

(72) Inventors: Wencheng Wu, Rochester, NY (US); Charles D. Rizzolo, Fairport, NY (US); Dennis L. Venable, Marion, NY (US); Thomas F. Wade, Rochester, NY (US)

(73) Assignee: Conduent Business Services, LLC, Dallas, TX (US)

( * ) Notice: Subject to any disclaimer, the term of this patent is extended or adjusted under 35 U.S.C. 154(b) by 217 days.

(21) Appl. No.: 15/066,507

(22) Filed: Mar. 10, 2016

(65) Prior Publication Data
US 2017/0262724 A1 Sep. 14, 2017

(51) Int. Cl.
| | |
|---|---|
| *G06K 9/00* | (2006.01) |
| *G06T 7/00* | (2017.01) |
| *G06Q 10/00* | (2012.01) |
| *G06K 9/32* | (2006.01) |
| *G06T 7/60* | (2017.01) |

(Continued)

(52) U.S. Cl.
CPC ..... *G06K 9/3233* (2013.01); *G06F 17/30259* (2013.01); *G06Q 10/087* (2013.01); *G06T 7/602* (2013.01); *G06T 7/70* (2017.01); *G06T 2207/30244* (2013.01)

(58) Field of Classification Search
None
See application file for complete search history.

(56) References Cited

U.S. PATENT DOCUMENTS

| | | |
|---|---|---|
| 5,512,739 A | 4/1996 | Chandler et al. |
| 6,473,122 B1 | 10/2002 | Kanekal |

(Continued)

OTHER PUBLICATIONS

U.S. Appl. No. 15/295,634, filed Oct. 17, 2016, Venable et al.
(Continued)

*Primary Examiner* — Utpal Shah
(74) *Attorney, Agent, or Firm* — Fay Sharpe LLP

(57) ABSTRACT

A method for profiling a location of an image capture device in a region of interest. The method comprises acquiring an image captured by an image capture device. The method comprises acquiring a reported position and pose of the image capture device. The method comprises processing the captured image to detect an object in the captured image. The method comprises identifying a set of interest points characterizing the captured object. The method comprises generating a relative position and pose of the interest points based on dimensional information associated with the captured object. The method comprises computing an estimated position and pose of the image capture device to the object using the reported position and pose of the image capture device and the relative position of the interest points. The method comprises computing the estimated position and pose of the mobile imaging device based on the estimated distance. The method comprises updating the reported position and pose of the image capture device to the estimated position.

20 Claims, 12 Drawing Sheets

(51) Int. Cl.
*G06Q 10/08* (2012.01)
*G06F 17/30* (2006.01)
*G06T 7/70* (2017.01)

(56) References Cited

U.S. PATENT DOCUMENTS

| | | | |
|---|---|---|---|
| 6,814,290 B2 | 11/2004 | Longacre | |
| 7,066,291 B2 | 6/2006 | Martins et al. | |
| 7,290,707 B2* | 11/2007 | Sawasaki | G06Q 10/087 235/385 |
| 7,386,163 B2 | 6/2008 | Sabe et al. | |
| 7,574,378 B2 | 8/2009 | Lipowitz et al. | |
| 7,693,757 B2 | 4/2010 | Zimmerman | |
| 8,189,855 B2* | 5/2012 | Opalach | G06Q 10/087 382/100 |
| 8,296,259 B1 | 10/2012 | Trandal et al. | |
| 8,326,069 B2 | 12/2012 | Maslov et al. | |
| 8,429,004 B2 | 4/2013 | Hamilton et al. | |
| 8,630,924 B2* | 1/2014 | Groenevelt | G06Q 10/087 211/90.01 |
| 9,015,072 B2 | 4/2015 | Wu et al. | |
| 9,443,164 B2 | 9/2016 | Sulc et al. | |
| 9,524,486 B2 | 12/2016 | Wu et al. | |
| 9,619,686 B2 | 4/2017 | Wu et al. | |
| 9,646,384 B2* | 5/2017 | Lee | G06T 7/73 |
| 2002/0141640 A1 | 10/2002 | Kraft | |
| 2002/0165790 A1 | 11/2002 | Bancroft et al. | |
| 2002/0196979 A1 | 12/2002 | Yen et al. | |
| 2003/0154141 A1 | 8/2003 | Capazario et al. | |
| 2004/0013295 A1 | 1/2004 | Sabe et al. | |
| 2004/0233278 A1 | 11/2004 | Prudhomme et al. | |
| 2006/0072176 A1* | 4/2006 | Silverstein | G06T 3/005 358/540 |
| 2006/0202032 A1 | 9/2006 | Kricorissian | |
| 2008/0077511 A1 | 3/2008 | Zimmerman | |
| 2008/0306787 A1 | 12/2008 | Hamilton et al. | |
| 2009/0059270 A1 | 3/2009 | Opalach et al. | |
| 2009/0212113 A1 | 8/2009 | Chiu et al. | |
| 2010/0070365 A1 | 3/2010 | Siotia et al. | |
| 2010/0171826 A1* | 7/2010 | Hamilton | G06Q 30/06 348/135 |
| 2013/0030915 A1 | 1/2013 | Statler et al. | |
| 2013/0103608 A1 | 4/2013 | Scipioni et al. | |
| 2013/0193211 A1 | 8/2013 | Baqai et al. | |
| 2013/0229517 A1 | 9/2013 | Kozitsky et al. | |
| 2013/0278761 A1 | 10/2013 | Wu | |
| 2013/0300729 A1 | 11/2013 | Grimaud | |
| 2013/0342706 A1* | 12/2013 | Hoover | G08G 1/0175 348/187 |
| 2014/0003727 A1 | 1/2014 | Lortz et al. | |
| 2014/0218553 A1 | 8/2014 | Deever | |
| 2014/0304107 A1 | 10/2014 | McAllister | |
| 2015/0046299 A1* | 2/2015 | Yan | G06Q 10/087 705/28 |
| 2015/0071524 A1* | 3/2015 | Lee | G06T 7/0075 382/154 |
| 2015/0178565 A1* | 6/2015 | Rivlin | G06T 7/004 382/103 |
| 2015/0363625 A1 | 12/2015 | Wu et al. | |
| 2015/0363758 A1 | 12/2015 | Wu et al. | |
| 2015/0365660 A1 | 12/2015 | Wu et al. | |
| 2015/0365669 A1 | 12/2015 | Wu et al. | |
| 2016/0110633 A1 | 4/2016 | Moore et al. | |
| 2016/0119540 A1 | 4/2016 | Wu | |
| 2016/0163091 A1* | 6/2016 | Wang | G06T 15/20 382/103 |
| 2017/0032311 A1 | 2/2017 | Rizzolo et al. | |
| 2017/0330334 A1* | 11/2017 | Takakura | G06T 7/246 |

OTHER PUBLICATIONS

U.S. Appl. No. 15/295,498, filed Oct. 17, 2016, Wu et al.
U.S. Appl. No. 15/295,031, filed Oct. 17, 2016, Rizzolo et al.
U.S. Appl. No. 15/066,392, filed Mar. 10, 2016, Venable et al.
Adelmann et al., "Toolkit for Bar Code Recognition and Resolving on Camera Phones—Jump-Starting the Internet of Things", Informatik Workshop on Mobile and Embedded Interactive Systems, pp. 1-7 (2006).
Bailey, "Super-Resolution of Bar Codes", Journal of Electronic Imaging, vol. 10, No. 1, pp. 213-220 (2001).
Ballard, "Generalizing the Hough Transform to Detect Arbitrary Shapes", Pattern Recognition, vol. 13, No. 2, pp. 111-122 (1981).
Bodnár et al., "Barcode Detection With Uniform Partitioning and Morphological Operations", Conf. of PhD Students in Computer Science, pp. 4-5 (2012).
Bodnár et al., "Improving Barcode Detection With Combination of Simple Detectors", Int'l Conf. on Signal Image Technology and Internet Based Systems, pp. 300-306 (2012).
Canny, "A Computational Approach to Edge Detection", IEEE Transactions on Pattern Analysis and Machine Intelligence, vol. PAMI-8, No. 6, pp. 679-698 (1986).
Ebner et al., "Development and Testing of a Color Space (IPT) With Improved Hue Uniformity", Proceedings of IS&T/SID's Sixth Color Imaging Conf., pp. 8-13 (1998).
Felzenszwalb et al., "Distance Transforms of Sampled Functions", Cornell Computing and Information Science, Tech. Rep., pp. 1-15 (2004).
Gonzalez et al., "Digital Image Processing", $3^{rd}$ Edition, Prentice Hall, pp. 1-22 (2008).
Hodges, "An Introduction to Video and Audio Measurement", Elsevier, p. 173-185 (2004).
Hunt, "The Reproduction of Colour", John Wiley & Sons, p. 48 (2004).
Jain et al., "Bar Code Localization Using Texture Analysis", Proceedings of the Second Int'l Conf. on Document Analysis and Recognition, pp. 41-44 (1993).
Joseph et al., "Bar Code Waveform Recognition Using Peak Locations", IEEE Transactions on Pattern Analysis and Machine Intelligence, vol. 16, No. 6, pp. 630-640 (1994).
Juett, "Barcode Localization Using a Bottom Hat Filter", NSF Research Experience for Undergraduates, pp. 1-26 (2005).
Katona et al., "A Novel Method for Accurate and Efficient Barcode Detection With Morphological Operations", Eighth Int'l Conf. on Signal Image Technology and Internet Based Systems, pp. 307-314 (2012).
Kiryati et al., "A Probabilistic Hough Transform", Pattern Recognition, vol. 24, No. 4, pp. 303-316 (1991).
Kuroki et al., "Bar Code Recognition System Using Image Processing", Hitachi Process Computer Engineering, Inc., pp. 568-572 (1990).
Lin et al., "Multi-Symbology and Multiple 1D/2D Barcodes Extraction Framework", Advances in Multimedia Modeling, pp. 401-410 (2011).
Lin et al., "Real-Time Automatic Recognition of Omnidirectional Multiple Barcodes and DSP Implementation", Machine Vision and Applications, vol. 22, pp. 409-419 (2011).
Liyanage, "Efficient Decoding of Blurred, Pitched, and Scratched Barcode Images", Second Int'l Conf. on Industrial and Information Systems, pp. 1-6 (2007).
McKesson, "Linearity and Gamma—Chapter 12—Dynamic Range", arcsynthesis.org, pp. 1-7 (retrieved Jul. 11, 2013).
Muniz et al., "A Robust Software Barcode Reader Using the Hough Transform", Int'l Conf. on Information Intelligence and Systems, pp. 313-319 (1999).
Normand et al., "A Two-Dimensional Bar Code Reader", $12^{th}$ Int'l Conf. on Pattern Recognition, vol. 3, pp. 201-203 (1994).
Ohbuchi et al., "Barcode Readers Using the Camera Device in Mobile Phones", Proceedings of the 2004 Int'l Conf. on Cyberworlds, pp. 1-6 (2004).
Oktem et al., "A Superesolution Approach for Bar Code Reading", Electrical and Engineering Department, Atilim University, Turkey, pp. 1-4 (2002).
Oktem, "Bar Code Localization in Wavelet Domain by Using Binary", Proceedings of the IEEE $12^{th}$ Signal Processing and Communications Applications Conference, pp. 499-501 (2004).
Pavlidis et al., "Fundamentals of Bar Code Information Theory", Symbol Technologies, IEEE, pp. 74-86 ( Apr. 1990).

(56) References Cited

OTHER PUBLICATIONS

Poynton, "Digital Video and HDTV: Algorithms and Interfaces" Morgan Kaufman Publishers, pp. 260 and 630 (2003).
Poynton, "Frequently Questioned Answers About Gamma", poynton.com, pp. 1-3 (2010).
Reinhard et al., "High Dynamic Range Imaging: Acquisition, Display, and Image-Based Lighting", Morgan Kaufmann Publishers, p. 82 (2010).
Tuinstra, "Reading Barcodes From Digital Imagery", Ph.D. dissertation, Cedarville University, pp. 1-18 (2006).
Wittman et al., "Super-Resolution of 1D Barcode Images", University of Minnesota, pp. 1-41 (2004).
Wu et al., "Automatic Thresholding of Gray-Level Using Multi-Stage Approach", Proceedings of the Seventh Int'l Conf. on Document Analysis and Recognition, pp. 493-497 (2003).
Youssef et al., "Automated Barcode Recognition for Smart Identification and Inspection Automation", Expert Systems with Applications, vol. 33, No. 4, pp. 968-977 (2007).
Zhang, "Flexible Camera Calibration by Viewing a Plane From Unknown Orientations", Int'l Conf. on Computer Vision, Corfu, Greece, pp. 666-673 (1999).
Husky et al., "Unmanned Ground Vehicle, Clearpath Robotics," pp. 1-2 (2013).
Bay, H., A. Ess, T. Tuytellaars, and L. Van Gool. "SURF: Speeded Up Robust Features." Computer Vision and Image Understanding (CVIU). vol. 110. No. 3, pp. 346-359, 2008.

\* cited by examiner

HIGH ACCURACY LOCALIZATION SYSTEM AND METHOD FOR RETAIL STORE PROFILING VIA PRODUCT IMAGE RECOGNITION AND ITS CORRESPONDING DIMENSION DATABASE

BACKGROUND

The present disclosure is related to a localization system and method for determining a position of an imaging system in a region of interest. The system is contemplated for incorporation into an image or video-based application that can determine the spatial layout of objects in the region of interest. Particularly, the disclosure is contemplated for use in a product facility where the spatial layout of product content is desired, but there is no limitation made herein to the application of such method.

FIG. 1A shows a store profile generation system 10 in the PRIOR ART configured for constructing a store profile indicating locations of products throughout a product facility. The disclosure of co-pending and commonly assigned U.S. Ser. No. 14/303,809, entitled, "STORE SHELF IMAGING SYSTEM", by Wu et al., which is totally incorporated herein by reference, describes the system 10 as including an image capture assembly 12 mounted on a mobile base 14. The fully- or semi-autonomous mobile base 14 serves to transport at least one image capture device 16 around the product facility and can be responsible for navigating the system 10 to a desired location—such as a retail store display shelf 20 in the illustrated example—with desired facing (orientation), as requested by a control unit 18, and reporting back the actual position and pose, if there is any deviation from the request. The control unit 18 processes images of objects—such as products 22 in the illustrated example—captured by the image capture device 16. Based on the extracted product-related data, the control unit 18 constructs a spatial characterization of the image capture assembly 12, and generates information on the position and pose of the mobile base when the images were acquired.

However, the conventional store profile generation system including this navigation and localization capability may not reach the desired accuracy in cases where products are closely laid out. Using retail store displays as one illustrative example, merchandise can be displayed by wall mounts, hang rail displays, and/or peg hooks that are in such close proximity (e.g., one inch or less) that product location information generated by the assembly may be off by a measure.

In other words, when the existing store profile generation system ("robotic system") is instructed to move the image capture device to a goal position $(x^G, y^G)$ and pose $\theta^G$ ("coordinates") in the product facility, it generates a reported position and pose $(x^R, y^R, \theta^R)$ after it arrives at the instructed location. In a perfect system, the robot's actual position and pose $(x^A, y^A, \theta^A)$ will be identical to both the goal position and pose $(x^G, y^G, \theta^G)$ and the reported position and pose $(x^R, y^R, \theta^R)$. In practice, the actual position and pose will not match the goal position and pose nor the reported position and pose—i.e., small errors are introduced by the statistical nature of the navigation algorithms. Errors have been observed in the range of +/−3 inches in reported position $(x^R, y^R)$ and up to 4-degrees in pose $\theta^R$. More accuracy may be achieved in the navigation algorithms by adding very expensive, high accuracy sensors. However, the sensors can make the unit cost-prohibitive.

In practice, the existing system is not accurate enough. For example, a location error can result when the existing system reports an incorrect coordinate after stopping or moving around an obstacle (i.e., $(x^R, y^R, \theta^R) \neq (x^A, y^A, \theta^A)$). A navigation error can also result when the existing system's navigation takes the image capture assembly to a proximate location only, i.e., $(x^A, y^A, \theta^A) \neq (x^G, y^G, \theta^G)$, particularly in one instance when the navigation requires a reroute calculation to reach the destination. Particularly, the existing image capture assembly knows its position and pose by some measure, but that location may not be correct if the navigation calculated a route that ends in proximity to the goal coordinates, but not at the exact goal coordinates.

Although the navigation and localization capabilities are well-studied in the field of robotic systems, there are limitations in practice depending on the sensors, processors, and response time, etc. The existing image capture assembly can provide its coordinates to a user, but the coordinates may not match the goal. Furthermore, depending on the applications the importance of the navigation verses the localization features can be quite different. For the purpose of profiling the layout of a product facility, there exists a need for more accurate localization output. The system may generate errors, in response of which it may choose to weight one requirement more than the other. An algorithm is therefore desired that computes an estimated position and pose $(x^E, y^E, \theta^E)$ that reflects the actual position of the robotic system with higher accuracy.

That is, the present disclosure further desires to provide an algorithm that can produce the estimated position and pose $(x^E, y^E, \theta^E)$ such that errors between the estimated position and pose $(x^E, y^E, \theta^E)$ and the actual position and pose $(x^A, y^A, \theta^A)$ are smaller than those between the reported position and pose $(x^R, y^R, \theta^R)$ and the actual position and pose $(x^A, y^A, \theta^A)$ observed in a conventional robotic system.

INCORPORATION BY REFERENCE

The disclosure of co-pending and commonly assigned U.S. Ser. No. 14/303,809, entitled, "STORE SHELF IMAGING SYSTEM", by Wu et al., is totally incorporated herein by reference.

The disclosure of co-pending and commonly assigned U.S. Ser. No. 14/303,724, entitled, "IMAGE PROCESSING METHODS AND SYSTEMS FOR BARCODE AND/OR PRODUCT LABEL RECOGNITION", by Wu et al., is totally incorporated herein by reference.

The disclosure of co-pending and commonly assigned U.S. Ser. No. 14/303,735, entitled, "METHOD AND SYSTEM FOR SPATIAL CHARACTERIZATION OF AN IMAGING SYSTEM", by Wu et al., is totally incorporated herein by reference.

The disclosure of co-pending and commonly assigned U.S. Ser. No. 14/557,677, entitled, "SYSTEM AND METHOD FOR PRODUCT IDENTIFICATION", by Sulc et al., is totally incorporated herein by reference.

The disclosure by Bay, Ess, Tuytelaars, and Van Gool in "SURF: Speeded Up Robust Features", Computer Vision and Image Understanding, Vol. 110, No. 3, pgs. 346-359 (2008), the content of which is fully incorporated herein by reference.

BRIEF DESCRIPTION

One embodiment of the disclosure relates to a profiling system for determining a location of an image capture device in a region of interest. The system includes a non-transitory computer readable memory storing instructions that are executable by a processor. The processor is adapted to acquire an image captured by an image capture device. The processor is further adapted to acquire a reported position and pose of the image capture device. The processor is further adapted to process the captured image to detect an object in the captured image. The processor is further adapted to identify a set of interest points characterizing the captured object. The processor is further adapted to generate a relative position of the interest points based on dimensional information associated with the captured object. The processor is adapted to compute an estimated position and pose of the image capture device to the object using the reported position and pose of the image capture device and the relative position of the interest points. The processor is adapted to compute the estimated position and pose of the mobile imaging device based on the estimated position and pose. The processor is adapted to update the reported position and pose of the image capture device to the estimated position and pose.

Another embodiment of the present disclosure relates to a method for profiling a location of an image capture device in a region of interest. The method comprises acquiring an image captured by an image capture device. The method comprises acquiring a reported position and pose of the image capture device. The method comprises processing the captured image to detect an object in the captured image. The method comprises identifying a set of interest points characterizing the captured object. The method comprises generating a relative position of the interest points based on dimensional information associated with the captured object. The method comprises computing an estimated position and pose of the image capture device to the object using the reported position and pose of the image capture device and the relative position and pose of the interest points. The method comprises computing the estimated position and pose of the mobile imaging device based on the estimated distance. The method comprises updating the reported position and pose of the image capture device to the estimated position and pose.

DETAILED DESCRIPTION

The present disclosure is related to a localization system and method for determining a position and pose of an imaging system in a region of interest. The present disclosure is contemplated for use, in one embodiment, for profiling a product facility using object recognition via image analysis and a database storing object dimensions. As used herein, the terms "location", "position and pose", "location and pose", and "location and orientation" are synonymous and interchangeable are each represented by (x, y, θ).

Figure 2:
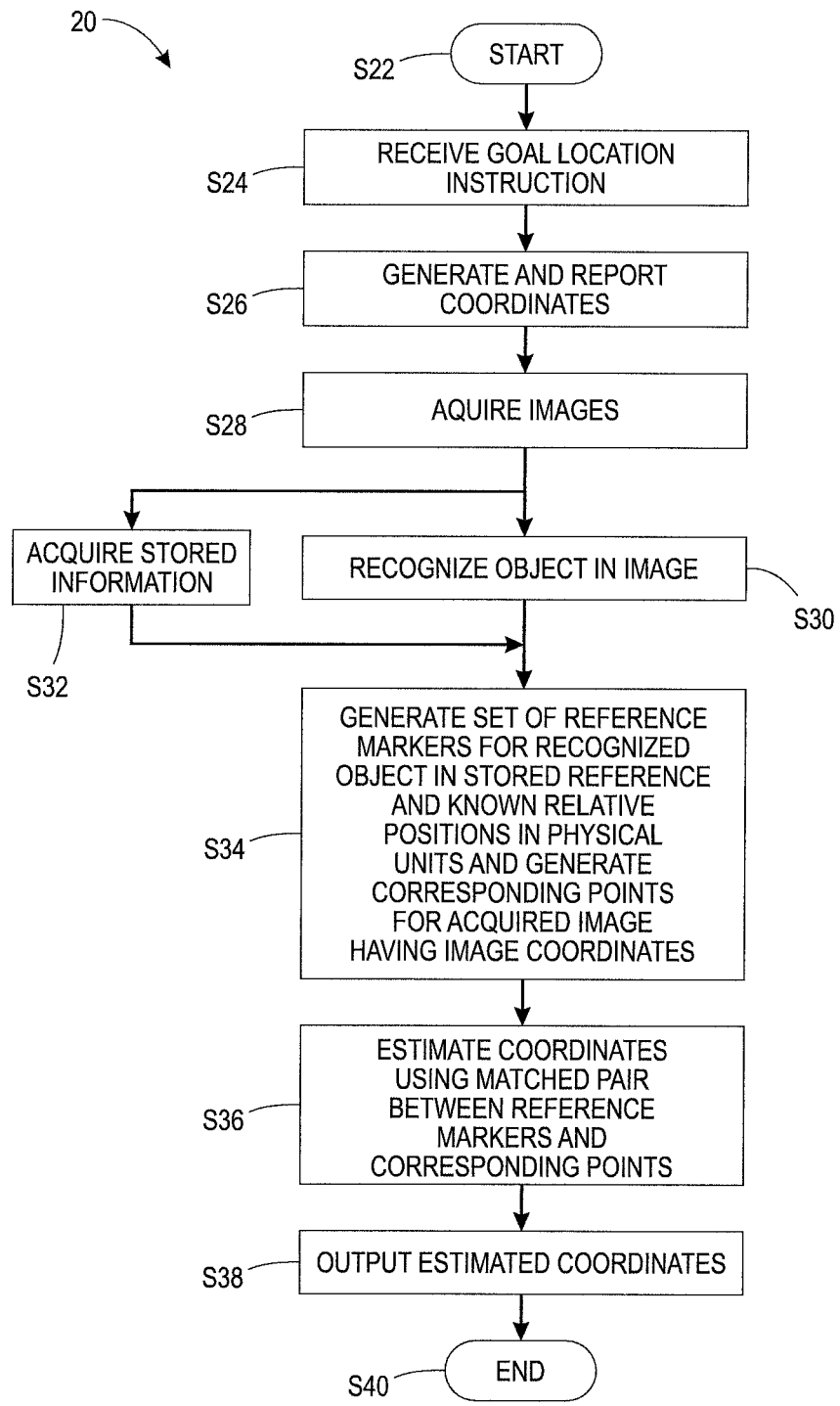
FIG. 2 is a flowchart illustrating an overview of the present method.

FIG. 2 is a flowchart showing an overview of the method 20. The method starts at S22. At S24, the system receives as input goal coordinates $(x^G, y^G, \theta^G)$ for instructing the image capture assembly to move to in the product facility. At S26, the image capture assembly generates and transmits reported coordinates $(x^R, y^R, \theta^R)$ after it arrives at an instructed position and intended pose. Note that "it arrives" simply means that the image capture assembly determines that it completed its instruction to "move to" the goal coordinates. In practice, the actual position and pose may vary from the goal coordinates or the reported coordinates, as discussed supra. At S28, an image capture device acquires images at the region of interest. In an illustrative example, the field of view can include a retail store display. At S30, the system analyzes a full or a portion of the acquired images to recognize an object or objects located in the images, such as a product being displayed on the display. In one embodiment, the system can extract feature information from the captured image and compare it to thumbnail images, or other stored information, in the database. At S32, the system accesses a database to retrieve dimensional information associated with the product recognized in the captured image (the "recognized product"). At S34, a set of relative reference markers with known relative positions in physical units and the corresponding points in the acquired image are generated. At S36, the system estimates the coordinates, including the location and the pose, of the image capture assembly using the matched pair between the reference markers and the corresponding points. The system provides the estimated coordinates $(x^E, y^E, \theta^E)$ at S38 to be used for determining a layout of the product within the product facility. The method ends at S40.

Figure 3:
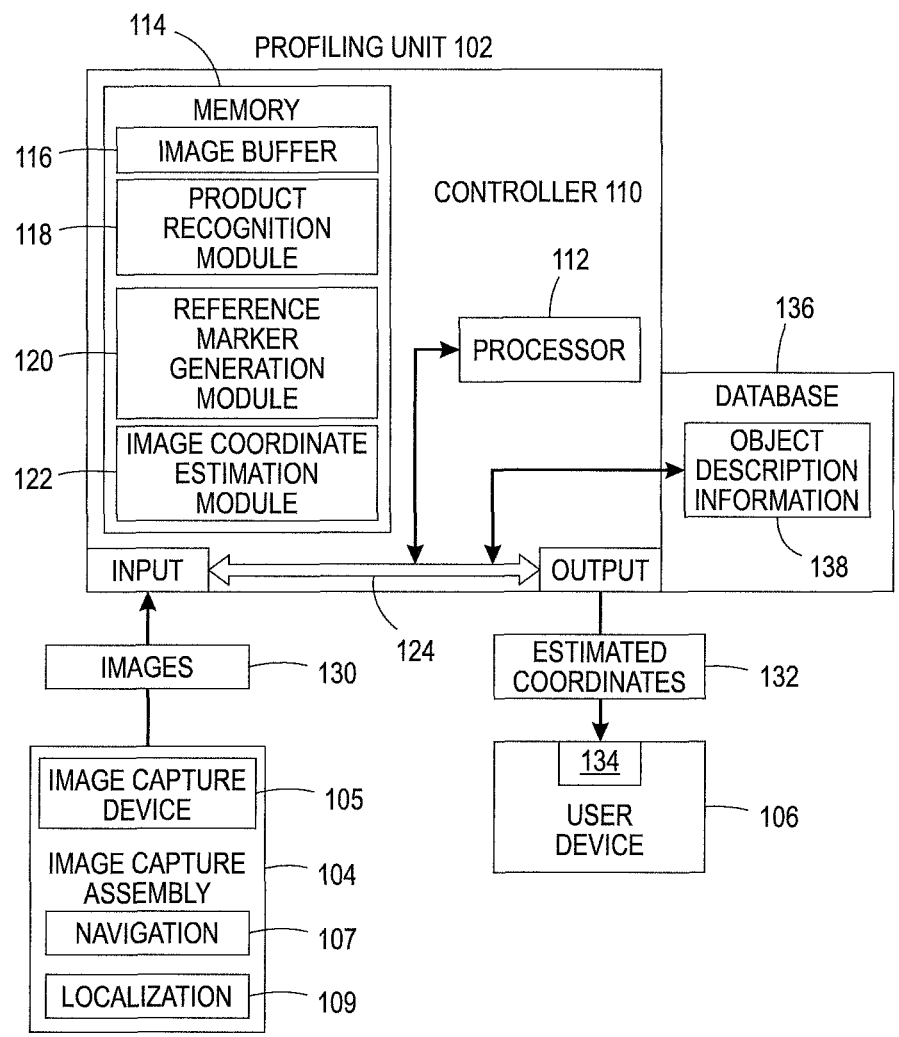
FIG. 3 is a schematic illustration of a camera-based localization system for estimating the location coordinates particularly the position and pose, of an image capture device carried by the system in a region of interest.
Figure 4A:
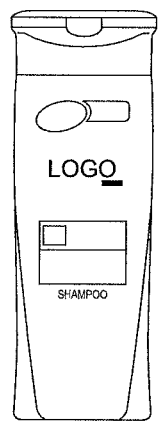
FIGS. 4A-4C shows example thumbnail images of varying perspectives stored in the database for objects, such as consumer products.
Figure 4B:
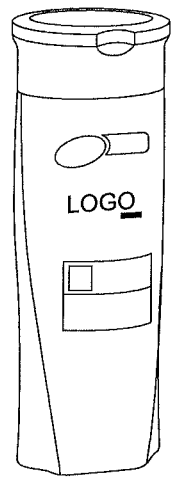
Figure 4C:

FIG. 3 is a schematic illustration of a camera-based localization system 100 for estimating the location coordinates particularly the position and pose, of an image capture device carried by the system in a region of interest. The system 100 includes a location profiling unit 102 and an image capture assembly 104, which is selectively mobile, linked together by communication links, referred to herein as a network. In one embodiment, the system 100 may be in further communication with a user device 106. These components are described in greater detail below.

The location profiling unit 102 illustrated in FIG. 3 includes a controller 110 that is part of or associated with the location profiling unit 102. The exemplary controller 110 is adapted for controlling an analysis of image data received by the system 100 to generate an estimated location and pose of the item captured in the image. The controller 110 includes a processor 112, which controls the overall operation of the location profiling unit 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the location profiling unit 102, executes instructions stored in memory 114 for performing the parts of the method outlined in FIGS. 1, 5, and 9. In some embodiments, the processor 112 and memory 114 may be combined in a single chip.

The location profiling unit 102 may be embodied in a networked device, such as an image capture device 105 supported by the image capture assembly 104, although it is also contemplated that the location profiling unit 102 may be located elsewhere on a network to which the system 100 is connected, such as on a central server, a networked computer, or the like, or distributed throughout the network or otherwise accessible thereto. In other words, the processing can be performed within the image capture device 105 on site or, as illustrated in FIG. 3, in a central processing offline or server computer after transferring the image data through a network. In one embodiment, the image capture device 105 can be adapted to relay and/or transmit the image data to the location profiling unit 102. In another embodiment, the image data 130 may be input from any suitable source, such as a workstation, a database, a memory storage device, such as a disk, or the like.

The image capture device 105 is in communication with the controller 110 containing the processor 112 and memory 114.

The stages disclosed herein are performed by the processor 112 according to the instructions contained in the memory 114. In particular, the memory 114 stores an image buffer 116, which acquires an image 130 captured by an image capture device 105; a product recognition module 118, which processes the captured image to detect and identify the object recognized in the image; a reference marker generation module 120, which generates a set of relative reference markers with known relative positions in physical units and corresponding points in the acquired image; and an imager coordinate estimation module 122, which estimates the position and pose of the image capture assembly 104 using matching pairs of points between the reference markers and the corresponding points. Embodiments are contemplated wherein these instructions can be stored in a single module or as multiple modules embodied in different devices. The modules 116-122 will be later described with reference to the exemplary method.

The software modules as used herein, are intended to encompass any collection or set of instructions executable by the location profiling unit 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the location profiling unit 102 may be all connected by a bus 124.

With continued reference to FIG. 3, the location profiling unit 102 also includes one or more communication interfaces 126, such as network interfaces, for communicating with external devices. The communication interfaces 126 may include, for example, a modem, a router, a cable, and and/or Ethernet port, etc. The communication interfaces 126 are adapted to receive the images 130 as input.

The location profiling unit 102 may include one or more special purpose or general purpose computing devices, such as a server computer, controller, or any other computing device capable of executing instructions for performing the exemplary method.

Figure 1A:
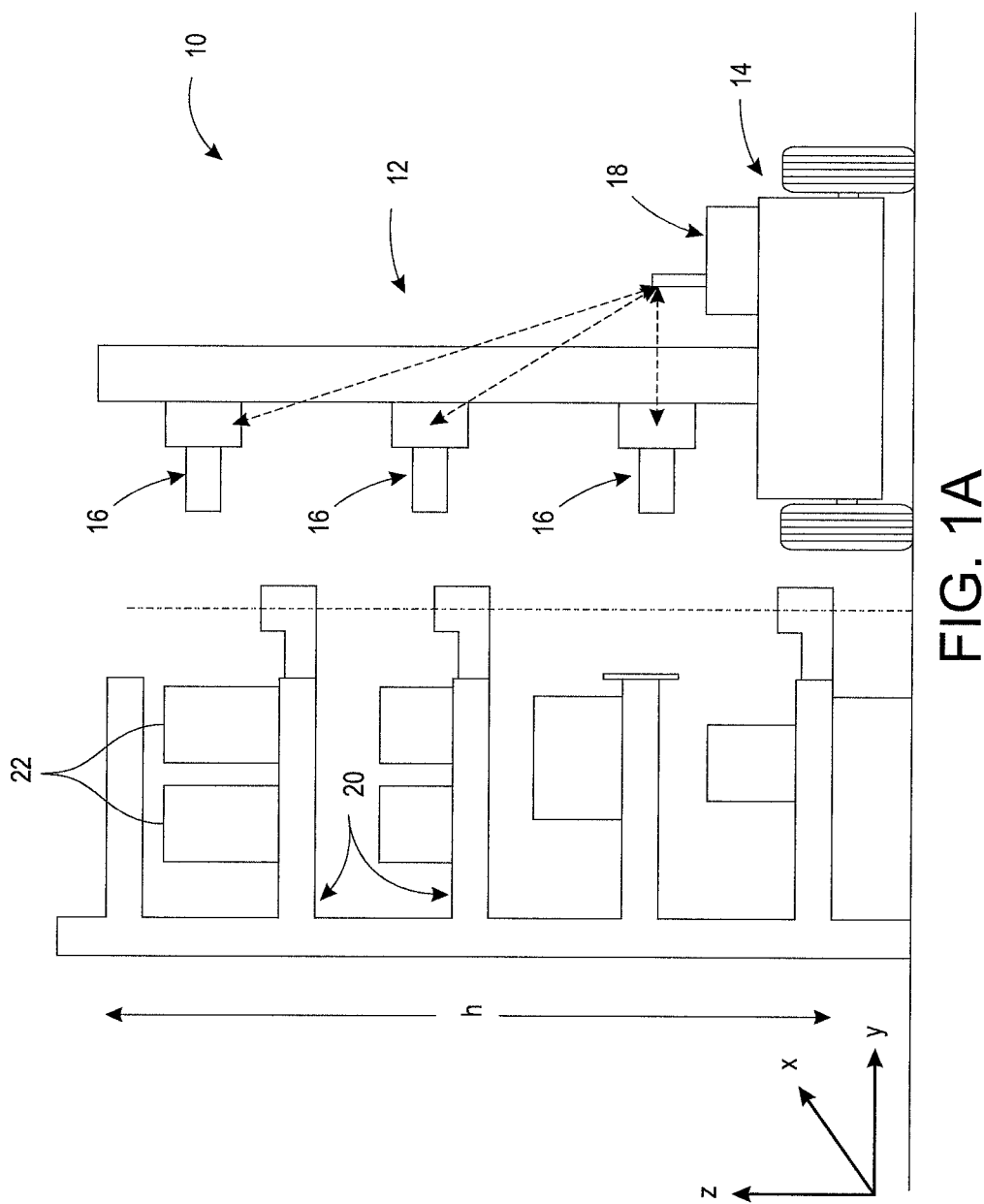
FIG. 1A shows a store profile generation system 10 in the PRIOR ART.

FIG. 3 further illustrates the location profiling unit 102 connected to the image capture assembly 104 for capturing and/or providing the image data in electronic format. FIG. 1A is an example image capture assembly 104 adapted for temporary deployment in a region of interest, such as a retail store location in one example. Returning to FIG. 3, the image capture assembly 104 can be used on a mobile or stationary platform, which can be carried by a user or an associated vehicle. Because the image capturing unit 104 is adapted to move about a region of interest, it can include a trailer. In the illustrated embodiment, the trailer includes wheels 132, but embodiments are contemplated which can include a framework that is easily transported by the user. The image capture assembly 104 includes at least one image capture device 105 supported thereon. In one contemplated embodiment, at least two image capture devices can be supported thereon the assembly 104. In one contemplated embodiment, a partial object can be captured in an image from one image capture device and matched with another portion of the object in a different image captured from a different image capture device, as long as there are at least two matched reference markers available. The image capture assembly 104 can include a navigation device 107 which maps directions to and moves the image capture assembly 104 toward the goal coordinates received by the system. The image capture assembly 104 can also include a localization module 109 which determines and reports (reported) coordinates ($x^R$, $y^R$, $\theta^R$) after it arrives at the instructed location.

Continuing with FIG. 3, the image capture device 105 (hereinafter "camera" 105) included on the image capture assembly 104 may include one or more cameras that capture images of objects located in the region-of-interest. The images (or image data) 130 undergoes processing by the location profiling unit 102 to output an estimated location and pose 132 of the image capture assembly and, inherently, the location of the object captured by the image capture device 104.

Furthermore, the location profiling unit 102 can provide the occupancy data to the output device 106, which can display the estimated coordinate information and/or desired output in a suitable form on a graphic user interface (GUI)

134. The GUI 134 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 112, which can display pricing strategy to a user, such as a parking area management company. Furthermore, in one contemplated embodiment, the output estimated coordinate information can be transmitted to another computer application, which can perform additional processing on the information to generate an ordered list of objects located in the region of interest.

With continued reference to FIG. 3, the system 100 includes a storage device or database 136 that is part of or in communication with the profiling unit 102. The storage device 136 can store object description information 138 for objects that are anticipated to be captured by the image capture device 105. This information can include, for example, SKU, manufacture, name, and/or a short description of objects; a thumbnail image of objects; and dimensional information. FIGURE S4A-4C shows an example object images stored in the database, for consumer products in the instance a product facility is the region of interest, whereby multiple thumbnail images 4A-4C describe the object from differing front, side, and back profiles. There is no limitation made herein to the information stored in the database 136.

Figure 5:
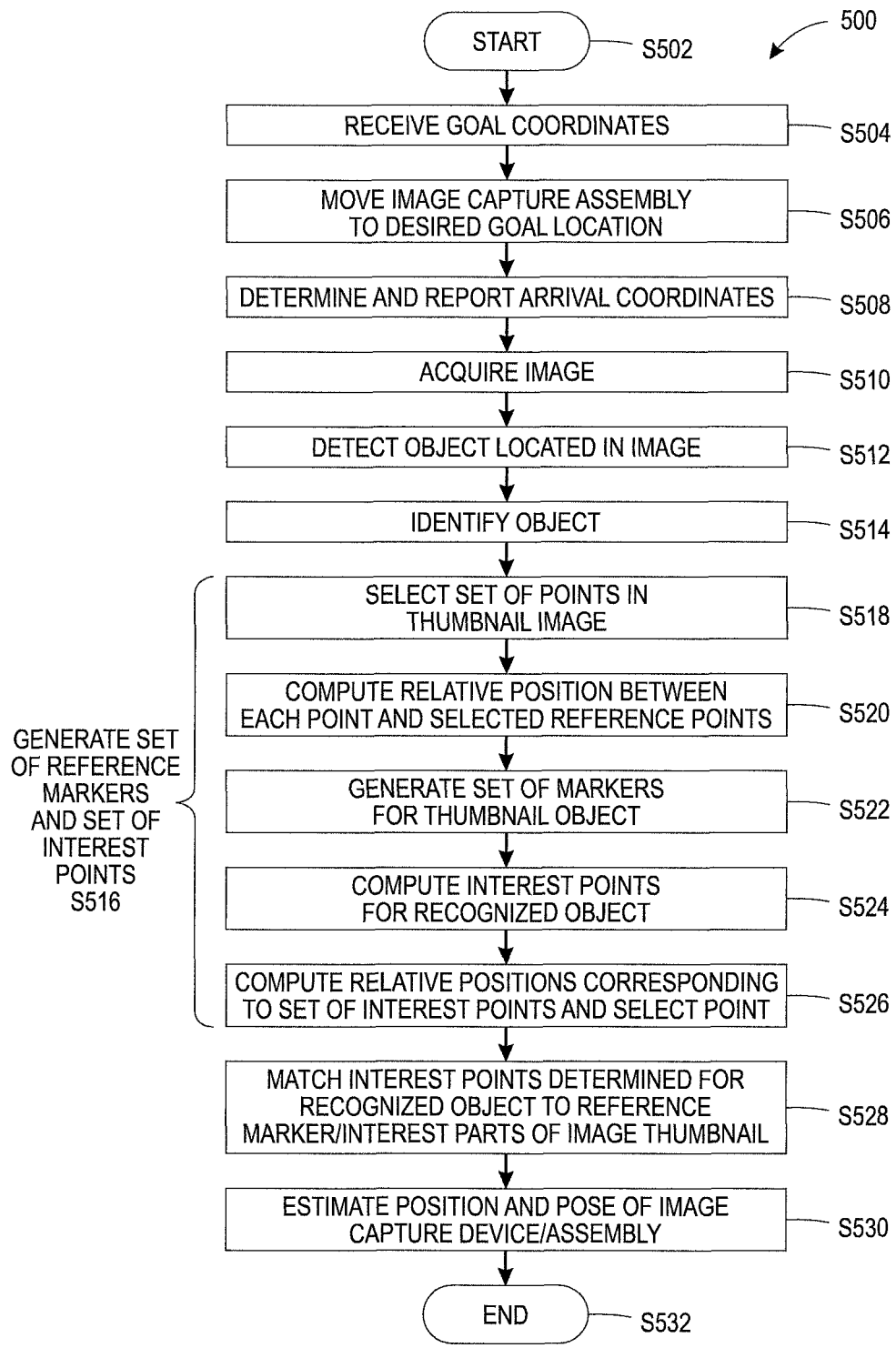
FIG. 5 is a flowchart of the method.

FIG. 5 is a flowchart showing a method 500 for estimating a position and pose of an imaging system in a region of interest and particularly using the position and pose to determine a layout of objects in the region of interest. The method starts at S502. First, the profiling unit 102 receives as input the goal location coordinates and, in one embodiment, pose/orientation coordinates for transmitting to the image assembly at S504. In a different embodiment, the image assembly can receive the coordinates and the navigation device 107 can calculate a route. In another embodiment, the profiling unit 102 can receive the route information as input. In the illustrative embodiment, the image capture assembly (see FIGS. 1A-B), is capable of navigating the image capture device autonomously after receiving the coordinates from the profiling unit 102. However, embodiments are contemplated which preclude this operation because the image capture device can be manually moved to the goal coordinates. Using the received goal coordinates, at S504, the image capture assembly autonomously navigates and moves through the region of interest to arrive at the desired goal location. Embodiments are contemplated where the navigation capabilities of the image capture assembly can navigate the image capture device around obstacles to reroute the image capture device to the goal coordinates. In response to arriving at the goal coordinates, i.e., the instructed position with intended pose, the localization module 109 of the image capture assembly determines its coordinates and transmits reported coordinates ($x^R$, $y^R$, $\theta^R$) to the profiling unit 102 at S508.

As mentioned, supra, the reported location coordinates may not reflect the assembly's actual coordinates ($x^A$, $y^A$, $\theta^A$). Therefore, in response to the image capture assembly 104 reaching the desired location of the goal coordinates (for example, a retail store display in a region of interest), the image capture device 105 can capture an image(s) of the region. An approach for acquiring the images is disclosed in co-pending and commonly assigned U.S. Ser. No. 14/303,809, entitled, "STORE SHELF IMAGING SYSTEM", by Wu et al., is totally incorporated herein by reference. In the illustrative example, the target images may include a portion of a product, a product, or products offered for sale on the display; however, embodiments are contemplated where any object can be captured in any desired region of interest, which are not limited to product facilities.

The image buffer 116 can acquire the image transmitted from the image capture device 105 at S510. The acquired images are further analyzed to determine an object located in the image at S512. In one embodiment, information, such as features, extracted by the image buffer 116 can be compared against object description information stored in a database 136 to identify the object in the image. In other words, the captured image is compared against stored information to identify the captured object(s).

Figure 6A:
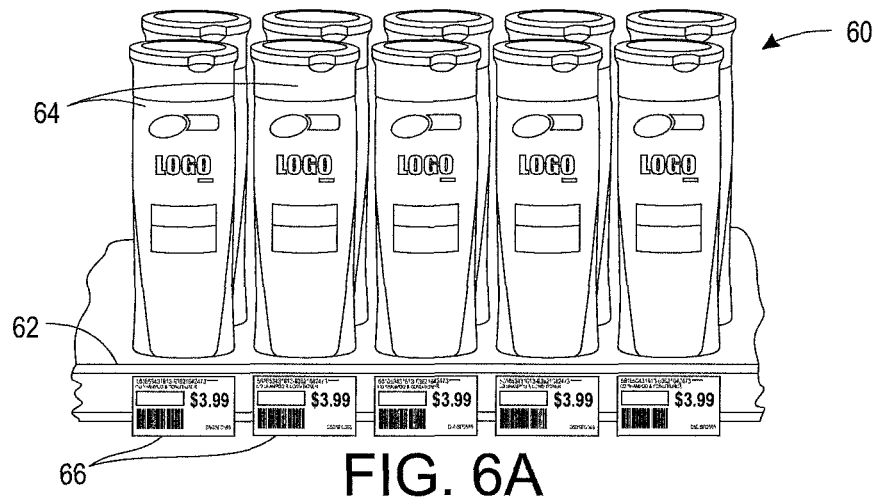
FIG. 6A shows a sample captured image of a retail store display shelf used to display consumer products.
Figure 6B:
FIG. 6B shows the tag portion of the image extracted from FIG. 6A.

At S514, the product recognition module 118 processes the captured image to detect and identify the object(s) recognized in the image. Particularly, the module 118 can analyze a full or portion of acquired images using one of multiple contemplated methods. In one embodiment, the module 118 can detect a barcode, such as the SKU, in the image. FIG. 6A shows a sample captured image 60 of a retail store display shelf 62 used to display consumer products. Particularly, bottles of merchandise 64, such as shampoo, is shown on a shelf with shelf labels (a.k.a., a shelf tags 66) including product identification information and a stock keeping unit ("SKU"). FIG. 6B shows the tag portion of the image extracted from FIG. 6A including the SKU 68.

An SKU is a specific number assigned by the store or the company/facility for keeping a tab on the stock and also the price of the various products. In one embodiment, the module 118 analyzes the portion of the image that includes the shelf tag 66 to identify the captured image.

The object database 136 contains object description information, such as SKU numbers. The module 118 can compare the extracted SKU with the SKUs stored in the database to identify the object captured in the image. The object database 136 can also, or alternately, store as object description information the manufacture, name, and a short description of the object associated with the SKU. In one contemplated embodiment, the object description information can include the SKU of a product, a price, a description (e.g., name or trademarked name of the product), the retailer/manufacturer/distributor, and segment information. In another contemplated embodiment, the stored object description information can also include dimensional information, such as the known height, width, or depth.

The disclosure of co-pending and commonly assigned U.S. Ser. No. 14/303,724, entitled, "IMAGE PROCESSING METHODS AND SYSTEMS FOR BARCODE AND/OR PRODUCT LABEL RECOGNITION", by Wu et al., is totally incorporated herein by reference, discloses a method for identifying the captured product using a barcode extracted from the image and is fully incorporated herein. The advantage of using this approach is that there is no additional computational need to test all thumbnail images of products stored in the database. However, this approach only recognizes the object that should be displayed on the display, and may error when products are misplaced and associated with the wrong barcode. Furthermore, systems are contemplated which do not use high resolution imaging systems. Therefore, the present disclosure also teaches an alternative or verification approach should the wrong product be displayed above the shelf tag. An approach is disclosed which can verify that the correct object is captured and, in the illustrative example, the correct product is displayed next to the shelf tag.

Figure 6C:
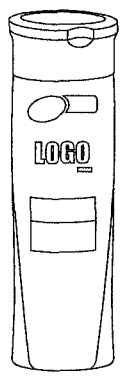
FIG. 6C shows a sample thumbnail image of a product.

In such embodiment, the object database 136 can store image thumbnails of objects. FIG. 6C shows a sample thumbnail image of a product.

Returning to FIG. 5, using features extracted from the captured image and comparing the features against the stored thumbnail images, the module 118 can identify the object captured in the image (hereinafter "the recognized object") by matching and classification at S514. Multiple thumbnail images can be stored for each product, particularly showing the product from different angles and perspectives. The thumbnail images can, in one embodiment, be retrieved from the Internet or such images can be provided to the database by a user. The module 116 can recognize the captured image though by matching between region(s) of the acquired image to the product thumbnail. Such an approach is provided in the disclosure of co-pending and commonly assigned U.S. Ser. No. 14/557,677, entitled, "SYSTEM AND METHOD FOR PRODUCT IDENTIFICATION", by Sulc et al., is totally incorporated herein by reference. This approach can recognize the object in the captured image even if the object was misplaced and located at the wrong location. The output generated by the module 118 is at least one recognized object and, in certain embodiments, a number of recognized objects. Using the recognized object, the dimensional information and a thumbnail image of the object are accessed in the database.

The reference marker generation module 120 and the imager coordinate estimation module 122 use this information to improve the localization of the image capture assembly.

Figure 7A:
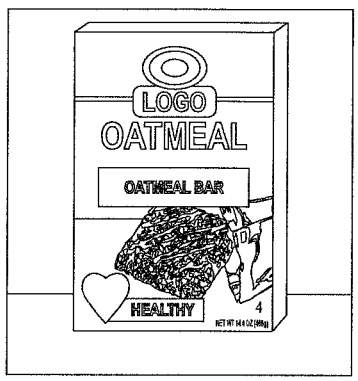
FIG. 7A shows a sample product in a thumbnail image for illustrative purposes.
Figure 7B:
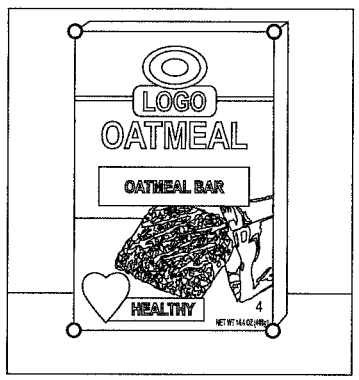
FIG. 7B shows four corners of a detected bounding box bounding the pictured product of FIG. 7A.

At S516, the reference marker generation module 120 generates a set of relative reference markers with known relative positions in physical units based on the dimensional information of the recognized object. In response to recognizing the object in the captured image, image analysis is performed on the object shown in the thumbnail image (hereinafter "the pictured object") to bound the pictured object in a virtual bounding box. The four corners of the bounding boxes are detected at S518. First, a set of points (at least two are needed) are selected from analyzing the thumbnail image of the recognized product. In one embodiment, the points are four (4) corners of a bounding box of the product. FIG. 7A shows a sample pictured product for illustrative purposes, only. FIG. 7B shows a virtual bounding box bounding the pictured product of FIG. 7A and the four corners detected.

Because the object may not be rectangular or box-shaped, the four corners detected in the thumbnail image may be challenging to match against the captured image. Therefore, the present disclosure provides an algorithm for matching distinct feature points between the recognized and pictured objects (or, in the illustrative example, product packaging).

Figure 7C:
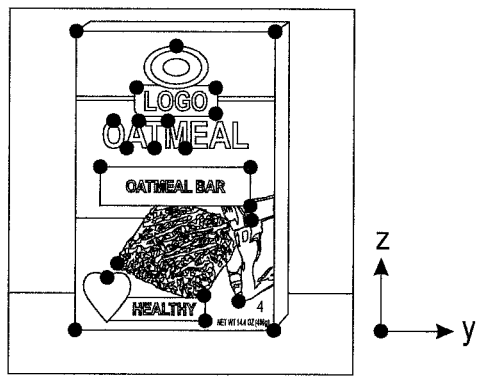
FIG. 7C shows a set of interest points detected for the pictured product of FIG. 7A.

Particularly, an interest point detection is performed on the pictured object in the thumbnail image. Any known computer-vision approach can be used to perform the interest point detection. One approach uses Speeded Up Robust Features ("SURF") and is explained by Bay, Ess, Tuytelaars, and Van Gool in the publication titled "SURF: Speeded Up Robust Features", Computer Vision and Image Understanding, Vol. 110, No. 3, pgs. 346-359 (2008), the content of which is fully incorporated herein by reference. FIG. 7C shows the detected interest points in the sample object in FIG. 7A. Further embodiments contemplate that the reference markers can be detected in a pre-processing operation when the thumbnail image is stored in the database and the set of reference markers can also be stored in the database.

In one embodiment, a database can be generated including

In another embodiment, the points are interest points detected using computer vision technologies such as Corner detectors, Harris corner detector, SIFT, LoG, DoG and DoH scale-space interest points, and SUSAN detector, etc. The set of points can be a union of points from multiple methods if more points are desired.

Next, height and width (dimensional) measurements are computed using the corners at S520. However, certain embodiments contemplate that the height and width corresponding to the pictured object in the thumbnail image may be known and previously stored in the database. The height and width information is used to generate a set of relative reference markers. Mainly, one of the points is selected as the reference and then relative position is computed, in physical units, between all other points relative to the selected reference point based on the dimensional information of the recognized product. This computation yields a first set of relative reference markers with known relative positions in physical units at S522. This first set of relative reference markers with known relative positions in physical units only needs to be computed once for each product and the information can be stored in the database. In some applications, this analysis can be performed every time an image is analyzed to avoid the need for storage.

Returning to FIG. 5, a set of interest points is also computed for the recognized object in the captured image, using the same process described above for the thumbnail image. In other words, the point detection process is repeated on the acquired image(s) or portion(s) of image (i.e., find object corners or interest points) to yield a second set of points at S524, which do not have known relative positions in physical units.

The relative pixel location (in coordinates) of each detected interest point is computed relative to a select point, such as one of the corners of the bounding box.

For example, where the image analysis at S514, supra, determined N recognized objects (e.g., the same or different objects), $M_l$ interest points and thus $M_l$ reference markers are determined for the k-th recognized object. If $(x_{kl}, y_{kl}, z_{kl})$ is the position of the l-th interest point from the k-th recognized item, then the relative positions using the first interest point as a reference can be described using the equation:

$$(y_{kl}, z_{kl}) - (y_{k1}, z_{k1}) = (\beta_{kl}, \gamma_{kl}) \, k=1\sim N, l=2\sim M_k \quad (1)$$

where the position of the l-th interest point from the k-th recognized item, $(x_{kl}, y_{kl}, z_{kl})$, is known up to an arbitrary reference point since the dimensional information is known and the image thumbnail is available. Once one of the detected interest point is selected as a reference, the relative positions of the reference markers are determined as described in Eq. (1).

This output provides $\Sigma_{i=1}^{N}(M_i-1)$ constraints/known-relationships that can be used to refine $(x^R, y^R, \theta^R)$ to a better estimate, $(x^E, y^E, \theta^E)$.

Figure 1B:
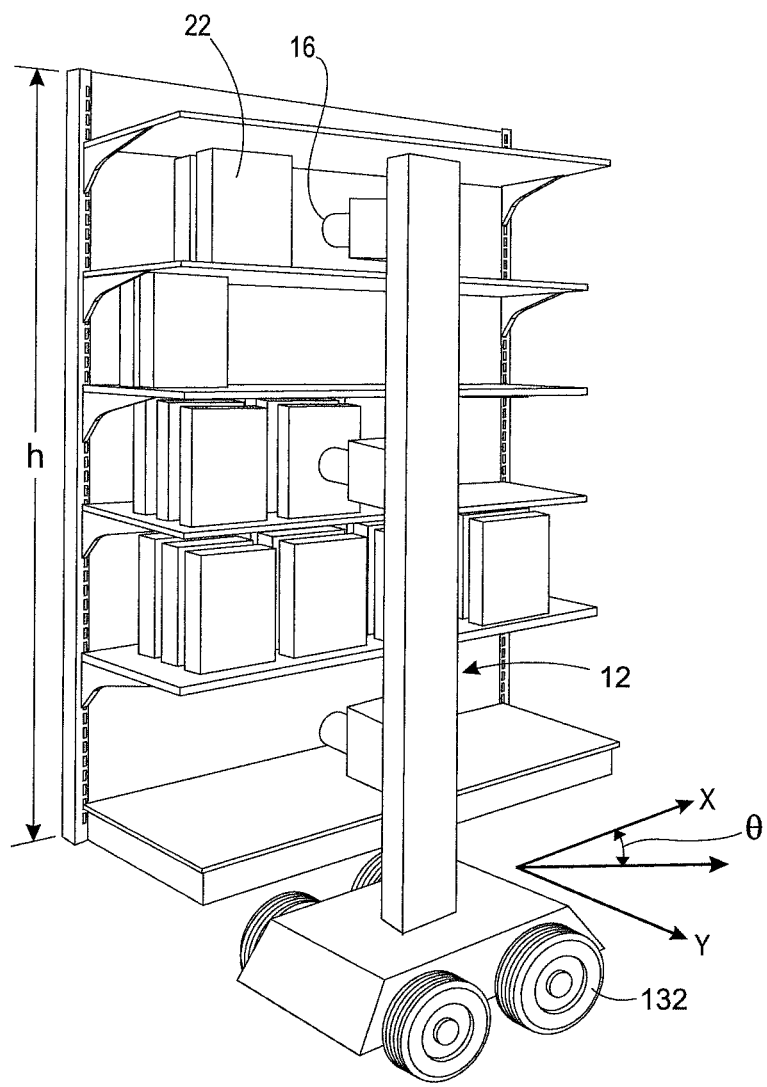
FIG. 1B shows the relative dimensional constraints of the image capture assembly

As illustrated in FIG. 1A, the dimensional information collected from recognized objects are in the y-z plane since the objects are located on the retail store display 20, while the position and pose of the image capture device 16 are in the x-y plane (as shown in FIG. 1A) and angle-θ (as shown in FIG. 1B). That is, the image capture assembly 12 only moves along the floor (in the illustrative embodiment) and thus the z-axis is fixed). However, given that the mounting positions of the image capture device(s) 16 (cameras) are known and fixed on the image capture assembly 12 and the initial calibration of the image capture devices are also known, it is possible to improve the estimate in x-y-θ even though the additional information comes from the y-z plane.

In other words, the relative pixel location of an interest point can be computed using the equation $(y_{in}, z_{in})-(y_c, z_c)=(y_{dn}, z_{dn})$ where z is the height of the object above ground; y is the direction orthogonal to the field of view; $(y_c, z_c)$ is a select point, which may be a corner in one embodiment; and $(y_{in}, z_{in})$ is the coordinates of one of n number interest points; and $(y_{dn}, z_{dn})$ is the relative dimension of the interest point against the corner. In other words, the dimensional information (e.g., height and width information) computed for the recognized object and the relative pixel coordinates of the detected interest points to one or more corners is used to derive a relative dimension between detected interest points. The number of interest points generated for the set should be sufficient enough to consider that not all points may be matched on a given acquired image.

Next, at S526, the set of relative dimensions corresponding to the set of interest points is used by the imager coordinate estimation module 122 to estimate the coordinates of the image capture assembly. As part of this process, the characteristics of the image capture assembly are also determined. The disclosure of co-pending and commonly assigned U.S. Ser. No. 14/303,735, entitled, "METHOD AND SYSTEM FOR SPATIAL CHARACTERIZATION OF AN IMAGING SYSTEM", by Wu et al., which is totally incorporated herein by reference, explains that in order to determine the spatial layout of the product facility, and particularly the object's location in the product facility, the position and pose of the image capture device and the spatial characteristics—i.e., a mapping that converts the pixel coordinate (i, j) to real-world coordinate (x, z))—are needed. The spatial characteristics are a function of the distance d of the image capture device to the object, or the retail store display in the illustrative example, and the angle/pose θ of the imager, which is also a function of the position and pose of the image capture device $(x^A, y^A, \theta^A)$. In other words, the spatial characteristics ("H") varies for different pixel location (i, j) and is a function of d and θ, i.e. H(i, j; d, θ). The spatial characteristics of the image capture device enables the module 122 to observe relative changes between expected reference markers to actual reference markers in the acquired image.

Figure 8A:
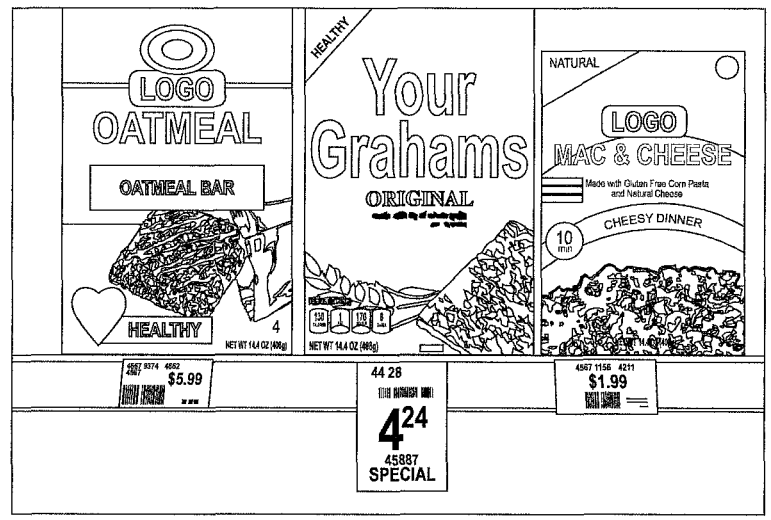
FIGS. 8A-8D illustrate how the spatial appearance of an object or product changes as the distance of the image capture assembly, or the angle of the image capture device, moves relative to the retail store display shelf.
Figure 8B:
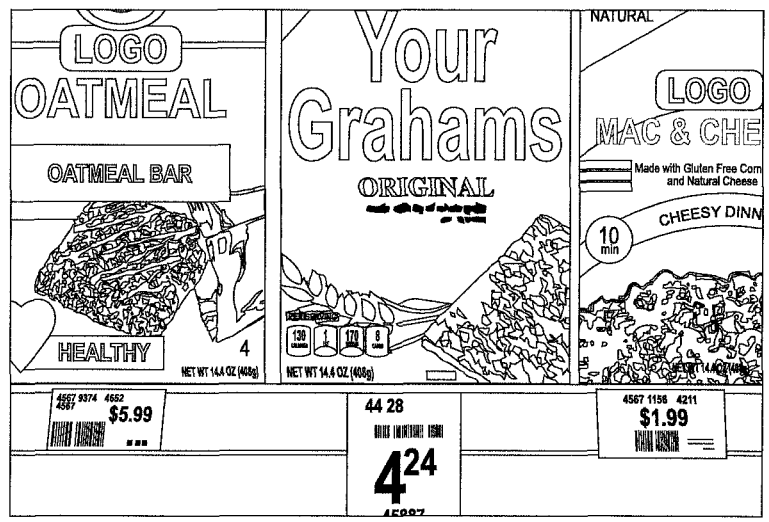
Figure 8C:
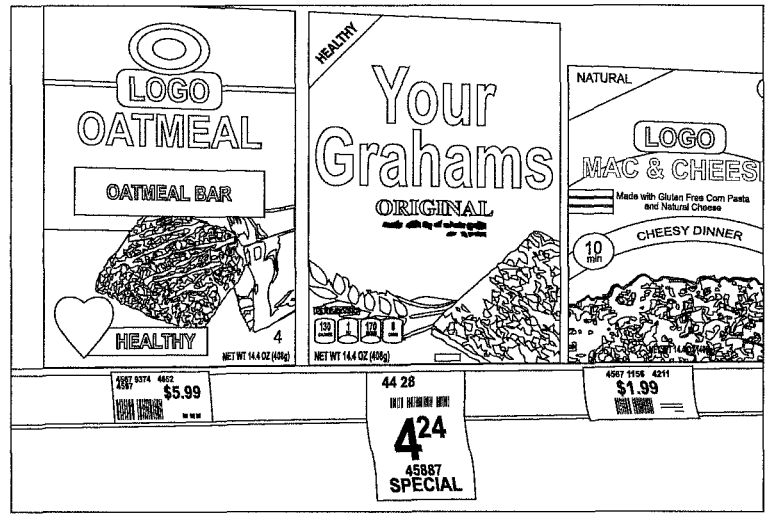
Figure 8D:
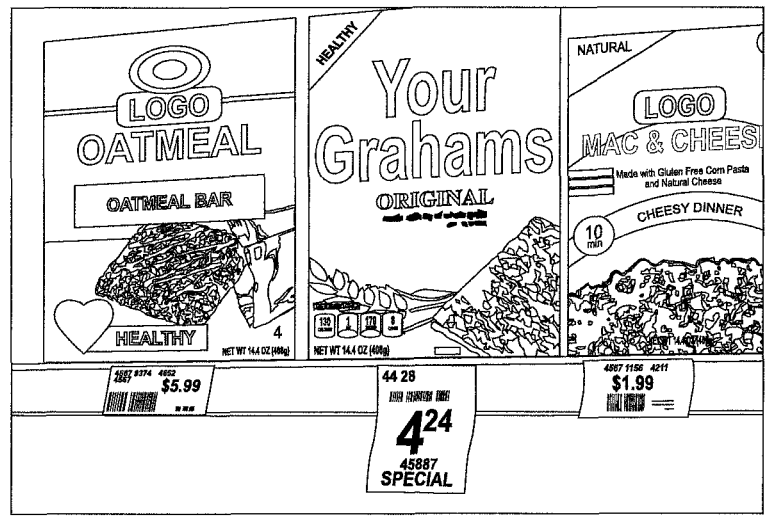

FIGS. 8A-8D illustrate how the spatial appearance of an object or product changes as the distance of the image capture assembly, or the angle of the image capture device, moves relative to the retail store display shelf. FIG. 8A is a sample image captured by the image capture device that shows the intended distance and pose of the image capture assembly to the retail store display. FIG. 8B shows another sample image where the image capture device is at the correct pose/angle, but the image capture assembly is at the incorrect distance to the retail store display. As shown in FIG. 8B, when the image capture assembly is too close to the retail store display, the distance between matched points appear to be further apart from one another than is expected. FIGS. 8C-D show another sample image where the image capture assembly is at the correct distance to the retail store display, but the pose/angle of the image capture device is incorrect particularly due to extra rotation. As shown in FIG. 8C, when the image capture device is rotated more than the correct pose/angle—resulting in a positive angle—the matched points on the closer side (right side of the object) appear to be closer than expected. As shown in FIG. 8D, when the image capture device is rotated less than the correct pose/angle—resulting in a negative angle or rotation—the matched points on the far side (left side of the object) appear to be farther than expected.

Returning to FIG. 5, at S528, the interest points detected from the acquired image(s) of the recognized object are matched against the SURF interest points/reference markers for the image thumbnail in the database. Because the acquired image may include multiple objects or only a portion of some objects, a point matching process using computer vision techniques (e.g., using SIFT matching to find a matching pair if SIFT points are detected) is performed to match between the points in the first set of relative reference markers with the known relative positions in physical units and points detected in the second set of points.

Figure 9:
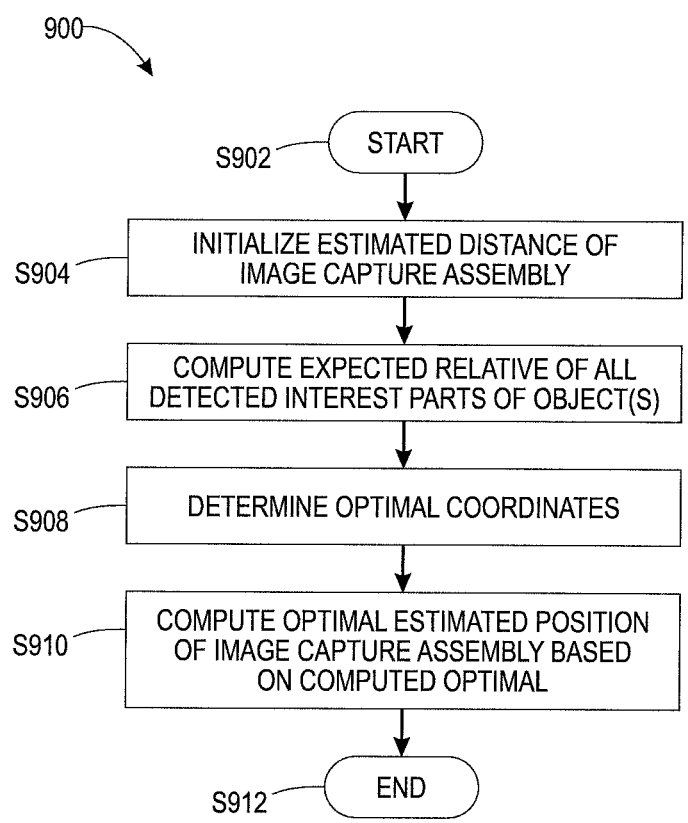
FIG. 9 shows a flowchart describing a method 900 for estimating the image capture assembly coordinates.

At S530, the resulting matching pairs of points are then used to estimate the coordinates, including the location and the pose, of the image capture assembly 12 based on information embedded in the matched pair of points. FIG. 9 shows a flowchart describing a method 900 for estimating the image capture assembly coordinates. The method starts at S902.

Figure 10:
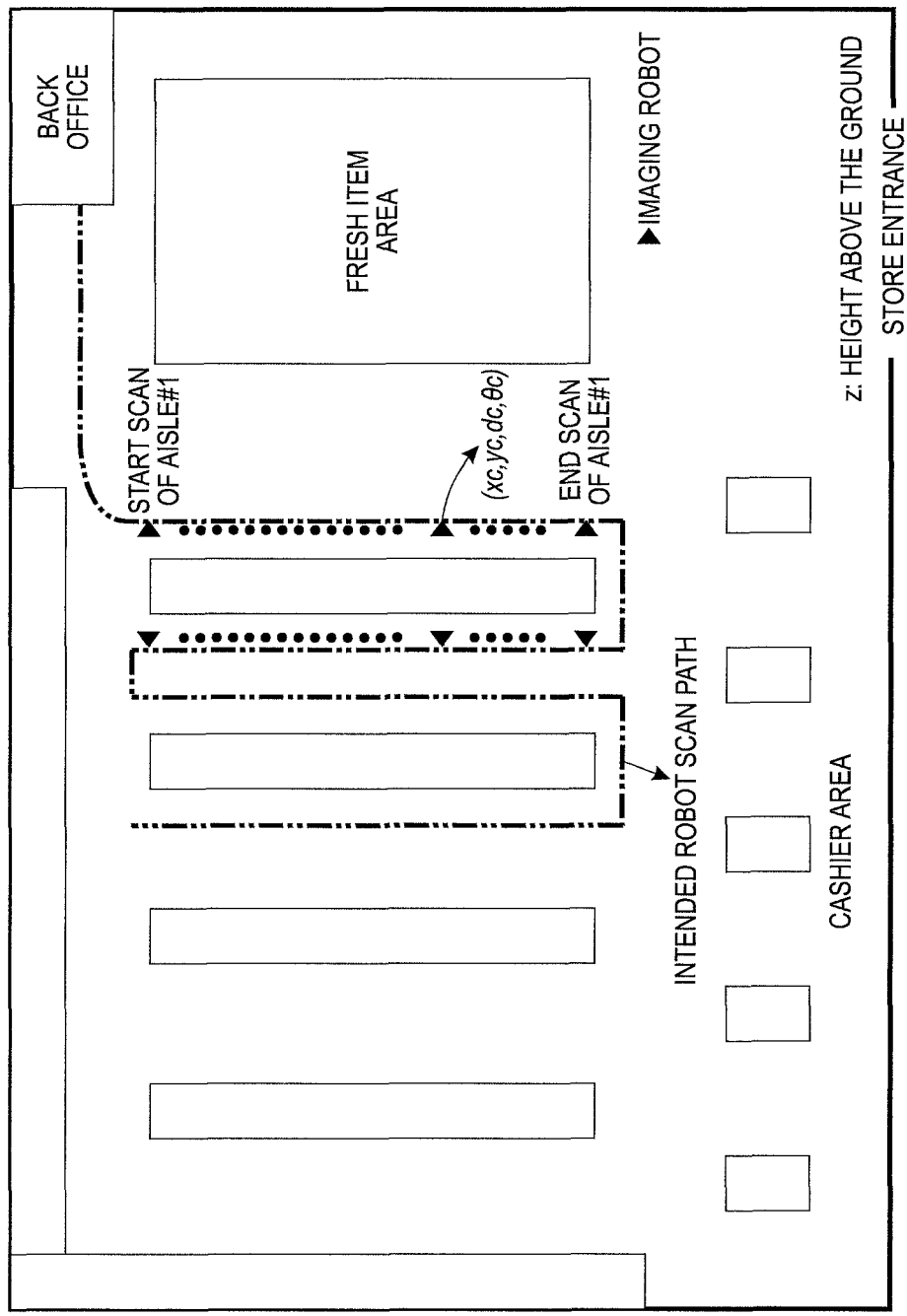
FIG. 10 shows a sample real-world coordinate system for an illustrative product facility.

First, a spatial mapping of the image capture assembly at a nominal distance (See, e.g., FIG. 8A) to the retail store display and pose can be described by the equation:

$$(x,y,z)=H(i,j;d,\theta) \quad (2)$$

wherein H is a mapping that converts the pixel coordinates (i, j) to real-word coordinates (x, y, z). A real world coordinate system is shown, for example, in FIG. 10 for an illustrative product facility. The spatial mapping changes as the distance to the shelf d or the angle of the imager θ changes. Furthermore, the mapping is only unique for a plane—such as the shelf tag plane—for a monocular image capture device.

At S904, the estimated distance $d^E$ of the image capture assembly to the object, or retail store display in the illustrated sample, based on reported imager position $(x^R, y^R)$ is initialized such that the estimated coordinates equal the reported coordinates: $(x^E, y^E, \theta^E)=(x^R, y^R, \theta^R)$.

At S906, the expected relative position of all detected interest points of all recognized objects is next computed using the equation:

$$(x_{kl},y_{kl},z_{kl})-(x_{k1},y_{k1},z_{k1})=H(i_{kl},j_{kl};d^E,\theta^E)-H(i_{k1},j_{k1};d^E,\theta^E) \quad (3)$$

wherein k=1~N, l=2 μM$_k$.

At S908, the optimal coordinates $(d^E, \theta^E)$ are determined. Any known numerical search approach, such as a gradient descend approach, can be used. More specifically, the optimal coordinates are determined by minimizing the total discrepancies between $H(i_{kl}, j_{kl}; d^E, \theta^E)-H(i_{k1}, j_{k1}; d^E, \theta^E)$ and $(\beta_{kl}, \gamma_{kl})$. Particularly, there may be no direct constraint on the X-direction, but discrepancies can result by constraints caused by the y-direction and the value of the pose θ. The reasoning, as discussed supra, is because the additional constraints/knowledge were utilized regarding the mounting positions of the image capture device(s) (incorporated in H(i, j; d, θ)) while the image capture assembly moves across the floor (fixed z). However, in practice, many objects with many reference markers would be detected while only two parameters d & θ need to be estimated. This creates an over-determined mathematical problem. As a result, a standard robust estimation technique, such as least square, and RANSAC (Random sample consensus), etc., may be employed to yield solutions that are robust against various noises and imperfectness of the acquired image data.

At S910, the optimal estimated position of the image capture assembly is computed $(x^E, y^E)$ based on the computed optimal $(d^E, \theta^E)$. The method ends at S912.

Returning to FIG. 5, the estimated position of the image capture assembly can be used in further applications to map a layout of the objects in the region of interest. In one example, the system can further generate a list ordering the objects by location, such that a user can use the list to visit the objects in the order they are displayed, thus saving labor and resource. The method ends at S532.

One aspect of the present system and method being image and/or video-based is greater capability. Visual information is more extensible when compared to alternate systems that use sensors, such as induction loops or sensors. One example application can include shelf-product identification in retail stores. The present disclosure can be implemented in retail applications where, for example, the present system can assist a mobile platform, such as a robotic imaging device, in automatically identifying products' locations on store shelves. The improvements to the localization capability of a store profile generation system disclosed herein provides a more accurate estimate of the distance between the image capture device to the retail display shelf and an improved estimate of the image capture device's pose (angle) to the display. Particularly, improvements to the localization aspects of the present disclosure enable a better estimation of the distance between the camera to the retail store display, and it provides better estimates for the angle of the camera to the shelf.

Further processing is contemplated which can generate an ordered list of the products based on the respective locations. Globally, retail chains—s.a., e.g.—grocers, pharmacies, etc.—share sale advertising and merchandising in common. One aspect of the presently disclosed system is an approach for determining product locations across a store such that sale item signage can be printed and packed in the order in which a store employee posts the signs on the shelves, thus eliminating the step of having to manually pre-sort the signage. The present disclosure is contemplated for use in any region of interest, not limited to stores, and is adapted to automatically collect object location data across the region of interest. One aspect of the presently disclosed method is that the output enables a user to automatically determine a spatial layout of the objects in the region of interest.

Although the control method is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A profiling system for determining a location of an associated image capture device in a region of interest, the system comprising:
   a processor; and
   a non-transitory computer readable memory storing instructions that are executable by the processor to:
   acquire an image captured by an associated image capture device;
   acquire a reported position and pose of the associated image capture device;
   process the captured image to detect an object in the captured image;
   identify a set of interest points characterizing the captured object;
   generate a relative position and pose of the interest points based on dimensional information associated with the captured object;
   compute an estimated distance of the associated image capture device to the object using the reported position and pose of the associated image capture device and the relative position and pose of the interest points;
   compute an estimated position and pose of the associated image capture device based on the estimated distance; and
   update the reported position and pose of the associated image capture device to the estimated position and pose.

2. The system of claim 1, wherein the processor is further adapted to:
   transmit a layout of a region of interest to an associated mobile imaging device carrying the associated image capture device; and
   transmit a target position and pose to the associated mobile imaging device, wherein the target position and pose is located in the region of interest;
   acquire the reported position and pose of the associated image capture device after the associated mobile imaging device moves the associated image capture device to the target position and pose.

3. The system of claim 2, wherein the region of interest is a store and the captured object is a product located on a display in the store.

4. The system of claim 1, wherein the processor is further adapted to:
   access a database of stored reference images of reference objects, the database being in communication with the processor and associating dimensional information with each reference object;
   search the stored images to match the captured object to the reference object;
   in response to finding a match, determine the dimensional information associated with the reference object; and
   associate the dimensional information with the captured object.

5. The system of claim 4, wherein the processor is further adapted to:
   bound the reference object in a bounding box;
   associate each corner of the bounding box with a relative position in real-world coordinates based on the dimensional information;
   identify a set of reference markers in the reference image characterizing the reference object;

determine a relative reference position of each reference marker using at least one corner; and, compute a relative distance of the each reference marker to the at least one corner.

6. The system of claim 5, wherein the processor is adapted to:

assign a set of interest points as the set of reference markers, where the interest points are points detected on the reference image using a computer vision approach selected from a group consisting of: Corner detectors; Harris corner detector; SIFT; SURF; LoG; DoG; DoH scale-space interest points; SUSAN detector; and a combination of the above.

7. The system of claim 6, wherein the processor is adapted to:

associate a first interest point in the captured image as a reference point; and describe relative positions of the interest points using the equation:

$$(y_{kl}, z_{kl}) - (y_{k1}, z_{k1}) = (\beta_{kl}, \gamma_{kl}),$$

wherein for N reference objects, $M_l$ are the interest points corresponding to the captured object, $M_l$ is the reference markers determined for k-th reference object; and $(x_{kl}, y_{kl}, z_{kl})$ is a position of l-th interest point from k-th reference object, and the known value $(\beta_{kl}, \gamma_{kl})$ is derived based on the detected pixel locations of the interest point on the image of the reference object and its dimensional information.

8. The system of claim 6, wherein the processor is adapted to:

compute a relative pixel location of each one of the interest points of the captured object;

compute relative dimensions between the sets of interest points using the relative pixel locations;

compute coordinates of the associated image capture device to the captured object using the relative dimensions; and, compute the estimated position and pose of the associated mobile imaging device based on the computed coordinates.

9. The system of claim 8, wherein the processor is adapted to:

compute an expected relative position of each interest point using the equation:

$$(x_{kl}, y_{kl}, z_{kl}) - (x_{k1}, y_{k1}, z_{k1}) = H(i_{kl}, j_{kl}; d^E, \theta^E) - H(i_{k1}, j_{k1}; d^E, \theta^E),$$

wherein, k=1~N, l=2~$M_{k}$, and wherein H is a mapping that converts pixel coordinates to real-word coordinates.

10. The system of claim 1, wherein the processor is further programmed to determine spatial characteristics of the image capture assembly.

11. A method for profiling a location of an associated image capture device in a region of interest, the method comprising:

acquiring an image captured by an associated image capture device;

acquiring a reported position and pose of the associated image capture device;

processing the captured image to detect an object in the captured image;

identifying a set of interest points characterizing the captured object;

generating a relative position and pose of the interest points based on dimensional information associated with the captured object;

computing an estimated distance of the associated image capture device to the object using the reported position and pose of the associated image capture device and the relative position of the interest points;

computing an estimated position and pose of the associated the image capture device based on the estimated distance; and updating the reported position and pose of the associated image capture device to the estimated position.

12. The method of claim 11 further comprising:

transmitting a layout of a region of interest to an associated mobile imaging device carrying the associated image capture device; and transmitting a target position and pose to the associated mobile imaging device, wherein the target position and pose is located in the region of interest;

acquiring the reported position and pose of the associated image capture device after the associated mobile imaging device moves the associated image capture device to the target position and pose.

13. The method of claim 12, wherein the region of interest is a store and the captured object is a product located on a display in the store.

14. The method of claim 11, wherein the processor is further adapted to:

generate a relative position of the interest points, accessing a database of stored reference images of reference objects, the database being in communication with the processor and associating dimensional information with each reference object;

searching the stored images to match the captured object to the reference object;

in response to finding a match, determining the dimensional information associated with the reference object; and associating the dimensional information with the captured object.

15. The method of claim 14 further comprising:

bounding the reference object in a bounding box;

associating each corner of the bounding box with a relative position in real-world coordinates based on the dimensional information;

identifying a set of reference markers in the reference image characterizing the reference object;

determining a relative reference position of each reference marker using at least one corner; and, computing a relative distance of the each reference marker to the at least one corner.

16. The method of claim 15 further comprising:

after identifying the set of interest points, assigning a set of interest points as the set of reference markers, where the interest points are points detected on the reference image using a computer vision approach selected from a group consisting of: Corner detectors; Harris corner detector; SIFT; SURF; LoG; DoG; DoH scale-space interest points; SUSAN detector; and a combination of the above.

17. The method of claim 16, wherein the generating a relative position includes:

associating a first interest point in the captured image as a reference point; and describing relative positions of the interest points using the equation:

$$(y_{kl}, z_{kl}) - (y_{k1}, z_{k1}) = (\beta_{kl}, \gamma_{kl}),$$

wherein for N reference objects, $M_l$ are the interest points corresponding to the captured object, $M_l$ is the reference markers determined for k-th reference object; and $(x_{kl}, y_{kl}, z_{kl})$ is a position of l-th interest point from k-th reference object, and the known value ($\beta_{kl}$, $\gamma_{kl}$) is derived based on the detected pixel locations of the interest point on the image of the reference object and its dimensional information.

18. The method of claim 16, wherein the computing the estimated position and pose of the associated mobile imaging device includes:
  computing a relative pixel location of each one of the set of interest points of the captured object;
  computing relative dimensions between sets of interest points using the relative pixel locations
  computing coordinates of the associated image capture device to the captured object using the relative dimensions; and,
  computing the estimated position and pose of the associated mobile imaging device based on the computed coordinates.

19. The method of claim 18 further comprising, computing an expected relative position of each interest point using the equation:
  $(x_{kl}, y_{kl}, z_{kl}) - (x_{k1}, y_{k1}, z_{k1}) = H(i_{kl}, j_{kl}; d^E, \theta^E) - H(i_{k1}, j_{k1}; d^E, \theta^E)$, wherein k=1~N, l=2~$M_k$, and wherein H is a mapping that converts pixel coordinates to real-word coordinates.

20. The method of claim 11 further comprising:
  determining spatial characteristics of the image capture assembly.

* * * * *